(12) United States Patent
Dams et al.

(10) Patent No.: US 6,184,472 B1
(45) Date of Patent: Feb. 6, 2001

(54) STRIP FOR WINDING AROUND AND GRIPPING AN ELONGATE OBJECT

(75) Inventors: Francis Dams, Edegem; Maarten Michiels, Kortenberg; Jos Vandepoel, Halen, all of (BE)

(73) Assignee: N.V. Raychem S.A., Kessel-Lo (BE)

( * ) Notice: Under 35 U.S.C. 154(b), the term of this patent shall be extended for 0 days.

(21) Appl. No.: 09/155,196

(22) PCT Filed: Mar. 26, 1997

(86) PCT No.: PCT/GB97/00840

§ 371 Date: Sep. 23, 1998

§ 102(e) Date: Sep. 23, 1998

(87) PCT Pub. No.: WO97/36357

PCT Pub. Date: Oct. 2, 1997

(30) Foreign Application Priority Data

Mar. 26, 1996 (GB) .................................................. 9606319

(51) Int. Cl.[7] .................................................. H02G 15/04
(52) U.S. Cl. .............................................................. 174/93
(58) Field of Search ........................... 174/93, 92, 77 R; 138/89, 129, 135, 154

(56) References Cited

U.S. PATENT DOCUMENTS

| 3,199,541 | * | 8/1965 | Richitelli | 138/129 |
| 3,606,670 | * | 9/1971 | Wienand et al. | 138/129 X |
| 4,733,629 | * | 3/1988 | Hunt et al. | 138/129 X |
| 4,933,512 | | 6/1990 | Nimiya et al. | 174/92 |
| 5,124,507 | | 6/1992 | Dehling | 174/92 |
| 5,346,742 | | 9/1994 | Dehling | 428/67 |
| 5,883,333 | * | 3/1999 | Wambeke et al. | 174/92 |

FOREIGN PATENT DOCUMENTS

| 0 316 911 | 5/1989 | (EP) | ............................ H02G/15/013 |
| 2 427 668 | 12/1979 | (FR) . | |
| WO 96/09672 | 3/1996 | (WO) . | |

OTHER PUBLICATIONS

Search Report for International Application No. PCT/GB97/00840, Mailed Jul. 23, 1997.

* cited by examiner

Primary Examiner—Kristine Kincaid
Assistant Examiner—Chau N. Nguyen
(74) Attorney, Agent, or Firm—Allen, Dyer, Doppelt, Milbrath & Gilchrist, P.A.

(57) ABSTRACT

A strip for winding around and gripping an elongate object, e.g. a cable, each end of the strip including a connection part which may interlock with a respective connection part of another, substantially identical strip, thereby enabling a plurality of such strips to be connected together substantially end-to-end to form a longer strip for winding around and gripping an elongate object.

55 Claims, 4 Drawing Sheets

STRIP FOR WINDING AROUND AND GRIPPING AN ELONGATE OBJECT

BACKGROUND OF THE INVENTION

1. Field of the Invention

The present invention relates to a strip for winding around and gripping an elongate object, and to a kit of parts for forming such a strip. The elongate object may, for example, be one or more cables (especially telecommunications cables), wires, optical fibres or the like, or it may be one or more tubes or pipes or the like.

2. Brief Description of the Background Art

In the art of cable splice closures, it is known to wrap tape around a cable in order to build up its diameter to that of a cable entry port of a splice closure, in order to seal the closure. For example, U.S. Pat. No. 4,933,512 discloses a cable junction closure comprising a sleeve, a pair of rigid end plates for closing the spaces between the cables and the sleeve, an elastic tape wound around the cables for sealing any gaps between the cables and the rigid end plates, and an elastic tape wound around each rigid end plate for sealing any gaps between the end plates and the sleeve.

U.S. Pat. No. 5,124,507 comprises a sleeve, sealing members with cable passage openings for insertion in the ends of the sleeve, and semi-circular sealing elements in the form of individually removable bearing shells lining the cable passage openings of the sealing members, for adapting the openings to different cable diameters. In order to eliminate any air gaps between the cable and the surrounding bearing shells, a sealing tape or band is wound onto each cable.

U.S. Pat. No. 5,346,742 discloses a sealing tape for winding around a cable leading through a cable passage opening, to form a seal which fits between the cable and the cable passage opening. The inside of the tape facing the cable has a roughened surface to increase the friction between the tape and the cable. The roughened surface is formed by projecting friction elements, which may be made from fine-grained carborundum or emery embedded in an adhesive layer, or from metal or plastic teeth anchored in the material of the tape.

Co-pending International Patent Application No. PCT/GB95/02229 (Raychem) discloses a retention strip for winding around an elongate object, which when so wound in use can decrease in length when compressed around the object, thereby allowing contraction of the strip around the object. The entire disclosure of PCT/GB95/02229 is incorporated herein by reference. This international application, which is assigned to the assignee of the present invention, describes a retention strip for an elongate object, which retention strip is related to the present invention. The retention strip is particularly useful for retaining a cable because the strip can decrease in length when compressed around an object.

The retention strip typically contracts by the correct amount at each part of the circumference of a cable, as it comprises one or more, preferably a plurality, of collapsible portions, and decreases in length due to the collapsing of these collapsible portions, as needed. Preferably the collapsible portion can collapse by deforming, e.g. by being crushed or concertinaed or by buckling. Preferably, such deformation occurs in a direction generally or substantially parallel to the (axial) direction of extension of the elongate object around which the strip is wound. Each collapsible portion of the strip preferably comprises a relatively weak portion of the retention strip. More preferably, each collapsible portion comprises one or more webs extending between substantially non-collapsible portions, e.g. one or more relatively thin portions which can deform by buckling or concertinaing, for example.

The retention strip may be profiled such that, when spirally wound around an elongate object in use, successive windings interlock with each other, thereby substantially preventing helical displacement of the windings with respect to each other along the object. The retention strip may, for example, have a plurality of protrusions and recesses which can engage with each other when the strip is wound in use. More preferably, each substantially non-collapsible portion (where present) of the retention strip has one or more projections on one surface thereof and one or more cooperating recesses on the opposite surface thereof, such that, for example, when the strip is wound around an object, the projection of one non-collapsible portion fits together with the recess of another non-collapsible portion with which it overlaps, or by which it is overlapped.

The retention strip may be used as part of a cable splice closure, where it is used in combination with a housing and a compressing means to compress the retention strip around a cable extending, in use, into the housing. Further, the cable splice closure may also include at least one sealing member to form a seal between the housing and one or more cables extending into the housing. Each sealing member may have one or more cable entry apertures in which at least one retention strip may be located. Preferably, when the retention strip is contracted around a cable in a cable entry aperture through which the cable extends, the retention strip can grip, and thereby retain the cable in the aperture. Preferably the ends of the cable splice closure are sealed using such a sealing member.

SUMMARY OF THE INVENTION

The present inventors have now invented a new strip (which may be called a "rentention strip") which can be wound around a cable or other elongate object to retain the elongate object in place with respect to another article (e.g. a cable splice closure), and preferably also to retain sealing material in place around the elongate object on one side of the strip. The strip is particularly useful in applications in which an elongate object (e.g. an electrical or telecommunications cable, or a pipe) extends through an aperture in an article, and the elongate object needs to be secured to the article and/or any gaps between the article and the elongate object need to be closed. More especially, the strip has utility as part of a cable splice closure. For example, the strip may be wound around a cable (or more than one cable) in order to increase the effective diameter of the cable so that it is substantially the same as, or at least closer to, the diameter of a cable entry aperture of a cable splice closure. Depending upon the diameter of the aperture and the diameter of the cable or elongate object, the length of strip required will vary.

According to a first aspect, the present invention provides a strip for winding around and gripping an elongate object, each end of the strip comprising a connection part which may interlock with a respective connection part of another, substantially identical strip, thereby enabling a plurality of such strips to be connected together substantially end-to-end to form a longer strip for winding around and gripping an elongate object.

According to a second aspect, the invention provides a strip for winding around and gripping an elongate object, comprising a plurality of component strips according to the first aspect of the invention connected together substantially end-to-end.

According to a third aspect, the invention provides a kit of parts, comprising a plurality of substantially identical component strips for winding around and gripping an elongate object, each end of each component strip comprising a connection part which may interlock with a respective connection part of the other, or another, said substantially identical component strip, thereby enabling said plurality of component strips to be connected together substantially end-to-end to form a longer strip for winding around and gripping an elongate object.

When it is stated herein that the component strips are connected together substantially end-to-end, this includes the possibility of some overlap between the interconnected strips. In fact, the preferred embodiments of the invention, there is overlap, at least between the connection parts of the interconnected strips.

DETAILED DESCRIPTION OF THE PREFERRED EMBODIMENTS

The invention has the advantage that because a plurality of the strips may be connected together substantially end-to-end by means of the interlocking connection parts at the ends of the strips, the necessity of manufacturing continuous lengths of strip at the maximum length required for each application is avoided. Instead, the required length of strip may be assembled by connecting together the appropriate number of individual strips. This is particularly advantageous, for example, when the strip is moulded (e.g. from a plastics material), since moulding continuous lengths of strip at the maximum required length would normally be inefficient and expensive, since normally a range of lengths of strip is required, and the excess strip lengths would generally go to waste. Also, strip length requirements vary, and it cannot be guaranteed that the maximum strip length currently required will not, in the future, increase. For example, at present, the maximum length of strip normally required is in the region of 50–60 cm, but the average length of strip normally required is in the region of 20 cm. It cannot be guaranteed that in the future the normal maximum length required will not increase to, say, 70–80 cm. Furthermore, a range of lengths of strip between about 20 cm and about 60 cm is needed, and simply cutting a 60 cm length of strip into shorter lengths will normally result in a significant amount of waste.

The individual strips which are connected together (the "component strips") may be supplied un-connected as a kit. At the time of installation, the appropriate number of component strips may be selected from the kit and connected together in order to assemble a longer strip of the required length. Alternatively, strips of the correct length for each particular application may be supplied pre-assembled from the appropriate number of component strips. Component strips may be added to, or removed from, the pre-assembled strip, if required.

In preferred embodiment of the invention, each connection part of each component strip is substantially incapable of interlocking with one of the connection parts of another substantially identical strip. The two connection parts of the, or each, strip preferably each have a different shape. Preferably, neither connection part of the, or each, strip is capable of interlocking with a substantially identical connection part of another substantially identical strip.

It is particularly preferred that at least one of the connection parts (hereinafter called an overlapping connection part) of each component strip is shaped to overlap at least part of the connection part (hereinafter called an overlapped connection part) of another substantially identical strip with which it may interlock. Preferably, the or each overlapping connection part overlaps the overlapped connection part on both of the two main surfaces of the other substantially identical strip when the two connection parts are interlocked.

The two connection parts preferably overlap each other, and so the designations "overlapping" and "overlapped", as used herein, may be arbitrary.

Each overlapping connection part preferably extends through at least one opening in the overlapped connection part when the two connection parts are interlocked. Each overlapping connection part preferably includes at least one step which enables it to overlap the overlapped connection part on one of the two main surfaces of the other substantially identical strip, to extend through the opening in the overlapped connection part, and to overlap the overlapped connection part on the other of the two main surfaces of the other substantially identical strip, when the two connection parts are interlocked. Each overlapping connection part may comprise one or more extending parts which extend from a main part of the strip. Advantageously, the or each extending part may include at least one said step.

In particularly preferred embodiments of the invention, a main surface of each strip is adapted to face towards an elongate object when the strip is wound around the elongate object, and the connection parts are preferably shaped such that when each connection part interlocks with is respective connection part of the other substantially identical strip, the interlocking of the connection parts is reinforced when the interconnected strips are so wound around the elongate object. Advantageously, the main surface of each strip which is adapted to face towards the elongate object has a plurality of protrusions thereon, to enhance the grip of the strip on the elongate object.

It is most preferred that the overlapping and overlapped connection parts are shaped such that when they are interlocked, and the interconnected strips are wound around an elongate object, an end of the overlapping connection part which us furthest from the main part of the strip of which it is part, is located between the elongate object and the other, substantially identical, strip (i.e. on the "inside" of the other strip).

Each connection part of each strip preferably includes one or more projections and/or recesses which interlock with one or more recesses and/or projections, respectively, of the connection part of another, substantially identical, strip with which it interlocks.

The or each component strip is preferably formed (e.g. moulded) at least in part from a plastics material, e.g. polyethylene, polypropylene or polystyrene.

According to some aspects of the invention, not all of the component strips need necessarily be substantially identical to each other. For example, there may be two different types of strip. One type of strip may be connectable to the other type of strip, but strips of the same type may be incapable of being connected together, for example.

Thus, according to a fourth aspect of the invention, there is provided a kit of parts, comprising two component strips for winding around and gripping an elongate object, each end of each component strip comprising a connection part which may interlock with a respective connection part of the other component strip, thereby enabling the two strips to be connected together substantially end-to-end to form an interconnected pair of strips, and enabling a plurality of such pairs of component strips to be connected together substantially end-to-end, to form a longer strip for winding around and gripping an elongate object. The component strips which may be interconnected may be substantially identical to each other, or they may be different to each other.

A fifth aspect of the invention provides a strip for winding around and gripping an elongate object, comprising two component strips, an end of each component strip comprising a connection part which is interlocked with said connection part of the other component strip such that the two strips are connected together substantially end-to-end to form an interconnected pair of component strips, and each end of the interconnected pair of component strips comprises a connection part which may interlock with a respective connection part of a substantially identical interconnected pair of component strips, thereby enabling a plurality of such interconnected pairs of strips to be connected together substantially end-to-end to form a longer strip for winding around and gripping an elongate object.

In preferred embodiments of each aspect of the invention, when each component strip is connected to another component strip, and the interconnected strips are wound around an elongate object, the interconnected strips can decrease in length when compressed around the elongate object, thereby allowing contraction of the interconnected strips around the elongate object. This contraction of the wound strip around the elongate object may have one or both of two important advantages, as follows.

Firstly, it may enable a compression force to be transmitted effectively to a cable or other elongate object around most, or preferably all, of the circumference of the cable, thereby causing the cable to be gripped firmly and therefore, for example, secured to a cable splice closure against external forces acting on the cable.

Secondly, the fact that preferred strips according to the invention may contract around a cable may mean that they can provide enhanced sealing around the cable, for example to seal a cable splice closure from the environment. The contraction itself, may, in some circumstances, result in better sealing compared to that provided by known strips or tapes which do not contract in the manner of the invention. Even more advantageously however, use of such preferred strips normally provides better sealing than would be possible with known strips or tapes, when compressed around the cable. This may be because, for example, known strips or tapes may buckle under compression due to their inability to contract, thereby forming gaps between the buckled parts. The strip of the invention preferably contracts by the correct amount at each part of the circumference of the cable, thereby substantially preventing the formation of gaps which would normally form if a known (non-contracting) type of strip were used. The strip may, for example, of itself form a satisfactory environmental seal for a cable splice closure. Additionally or alternatively, the strip may, for example, provide sufficient retention of sealing material in a cable splice closure to enable the closure to be sealed from the environment by the sealing material. Preferably, therefore, when the strip according to the invention is contracted around an elongate object, it can substantially prevent passage of sealing material therethrough along the object, thereby retaining the sealing material on one side thereof.

Known tapes and strips do not have the above advantage because they do not decrease in length when compressed around a cable or the like, and hence they cannot normally contract around the cable in the manner of preferred strips according to the invention. The preferred strips of the invention have the advantage that they can be radially contracted when wound around an object, the requisite circumferential contraction being accommodated, at least in part, by a reduction in the length of the strip.

Preferably, each component strip comprises one or more, preferably a plurality, of collapsible portions, and each component strip and the component strips when interconnected, can decrease in length due to the collapsing of one or more of the collapsible portions. The collapsible portion(s) may collapse by means of any of a variety of mechanisms, for example by telescoping (in a manner similar to a collapsible telescope). Preferably, however, the or each collapsible portion can collapse by deforming, e.g. by being crushed or by buckling. Preferably such deformation occurs in a direction generally or substantially parallel to the (axial) direction of extension of the elongate object around which the strip is wound, in use, and can be directed inwardly and/or outwardly, preferably outwardly, with respect to the remainder of the strip. This generally has the advantage of not giving rise to the formation of gaps (or at least significant gaps) between the windings of the strip through which sealing material might otherwise be able to escape. The or each collapsible portion preferably comprises a relatively weak portion of the retention strip. More preferably, the or each collapsible portion comprises one or more webs extending between substantially non-collapsible portions, e.g. one or more relatively thin portions which can deform, e.g. by buckling.

Preferably, each component strip comprises a plurality of alternately collapsible and non-collapsible portions along at least part, preferably all, of the length thereof. This has the advantage of normally providing substantially uniform collapsibility along the length of the strip, such that the strip may contract relatively or substantially uniformly around an elongate object.

The or each collapsible portion (where present) of the strip may advantageously provide the flexibility to enable the strip to be wound around an elongate object. The or each substantially non-collapsible portion may, for example, be relatively or substantially inflexible: this stiffness can have the advantage of enabling the substantially non-collapsible portions of the strip to grip an elongate object relatively firmly. Advantageously, therefore, the strip may comprise a plurality of alternatively substantially inflexible and flexible portions along at least part of its length.

According to particularly preferred embodiments of the invention, each component strip is profiled such that, when spirally wound around an elongate object in use, successive windings interlock with each other, thereby substantially preventing helical displacement of the windings with respect to each other along the object. This may provide at least two important advantages. Firstly, it generally provides the strip with strength to resist axial forces acting on an elongate object (e.g. a cable) when it is wound around the object, i.e. it can substantially prevent the strip from telescoping out along the elongate object under the action of such axial forces, and therefore the grip of the strip on the elongate object can normally be retained. Secondly, it generally prevents accidental displacement of the windings of the strip with respect to each other (e.g. due to axial forces of the elongate object or for some other reason), which might otherwise compromise the ability of the strip to retain sealing material. The strip may, for example, have a plurality of protrusions and recesses which can engage with each other when the strip is wound in use. More preferably, the or each substantially non-collapsible portion (where present) of the strip has one or more projections on one surface thereof and one or more cooperating recesses on the opposite surface thereof, such that, for example, when the strip is wound around an object the projection(s) of one non-collapsible portion fit together with the recess(es) of another non-collapsible portion which it overlaps, or by which it is overlapped.

A fifth aspect of the invention provides a cable splice closure, comprising a housing to enclose a cable splice, the housing having one or more cable entry apertures therein, and a kit or one or more strips according to any of the other aspects of the invention, to grip one or more cables extending, in use, into the housing through a said cable entry aperture.

The invention will now be described, by way of example, with reference to the accompanying drawings.

Figure 1A:
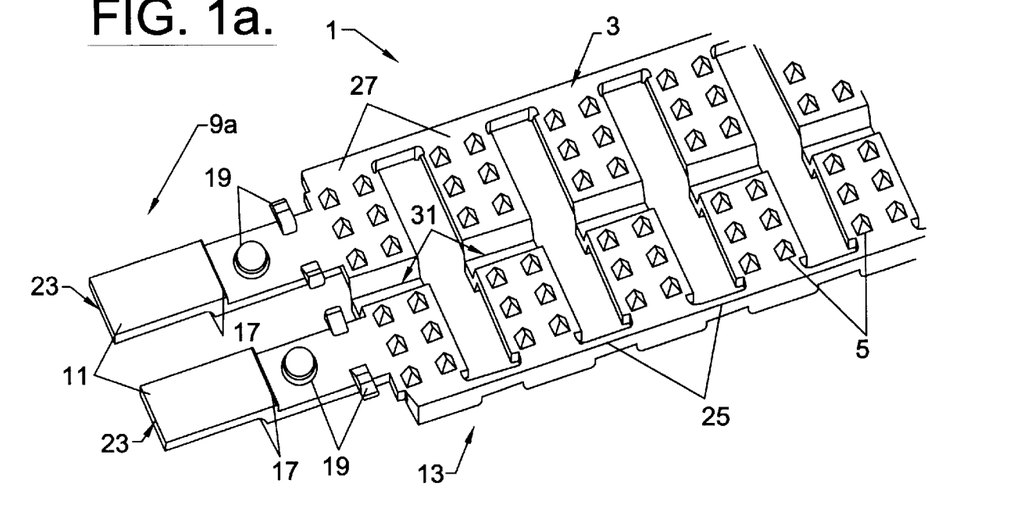
FIG. 1 shows one end region of a component strip according to the invention.
Figure 1B:
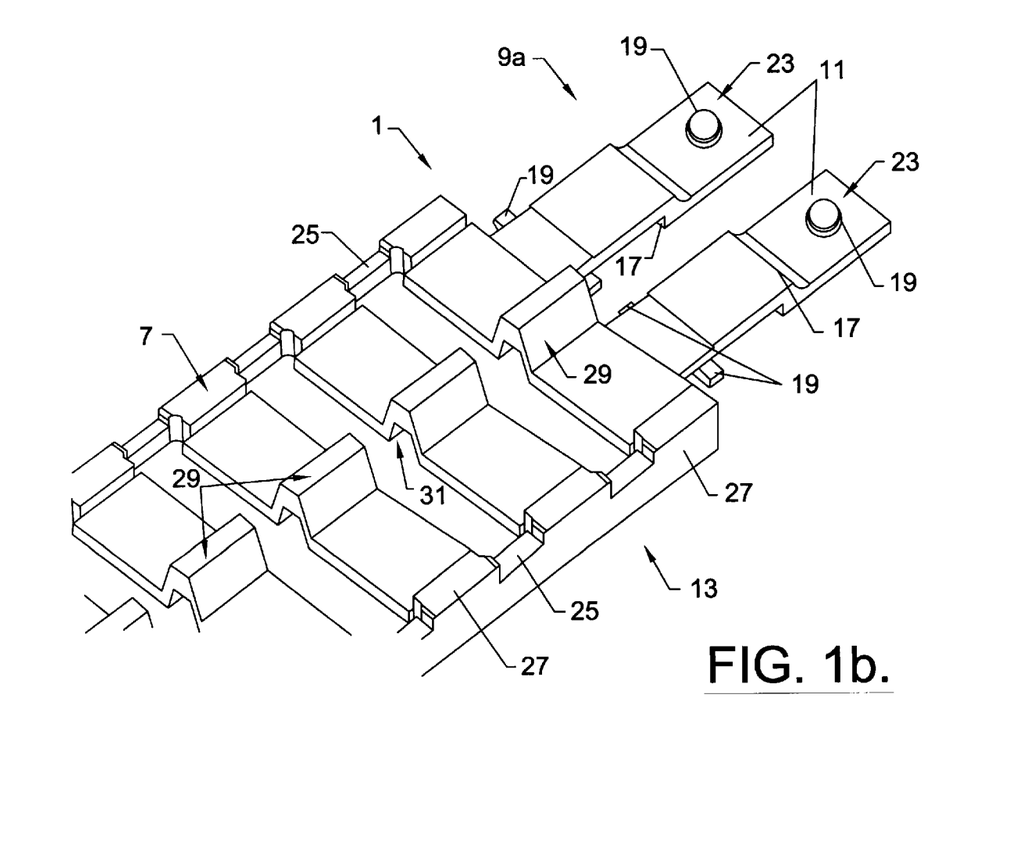

FIGS. 1a and 1b show opposite main surfaces of one end region of a component strip 1 according to the invention. FIG. 1a shows the main surface 3 of the strip 1, which, in use, faces towards a cable or other elongate object, and which has a plurality of protrusions 5 for enhancing the grip of the strip on the cable. FIG. 1b shows the opposite main surface 7 of the strip 1 which, in uses, faces away from the cable. The end of the strip comprises a connection part 9a (referred to herein as an "overlapping" connection part) which comprises two extending parts 11 extending from a main part 13 of the strip. The connection part 9, and the rest of the strip 1, will be described in more detail below.

Figure 2A:
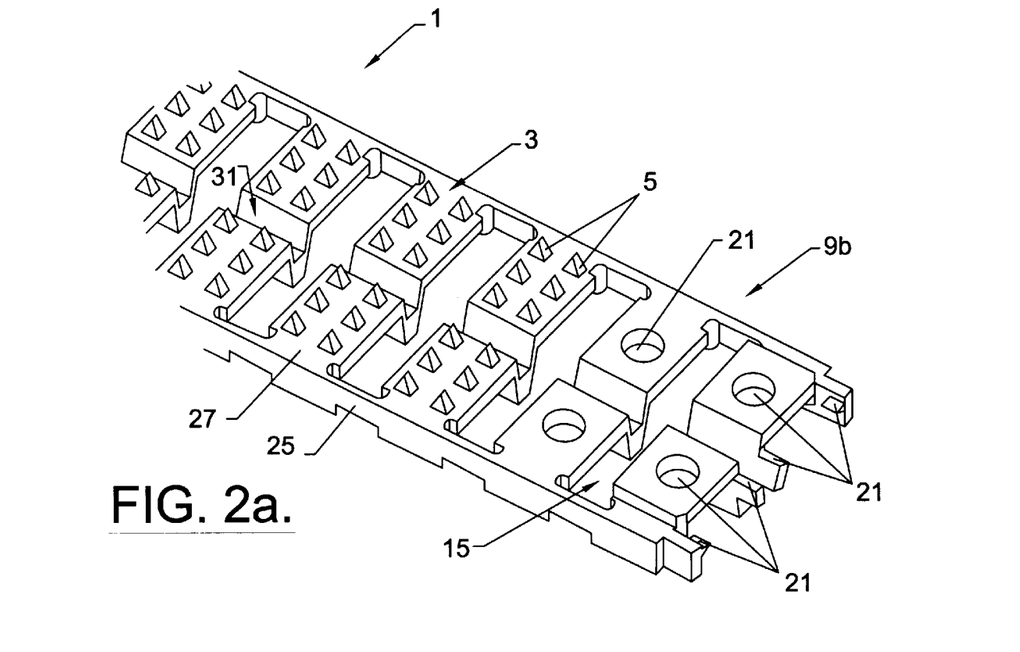
FIG. 2 shows the other end region of the strip shown in FIG. 1.
Figure 2B:
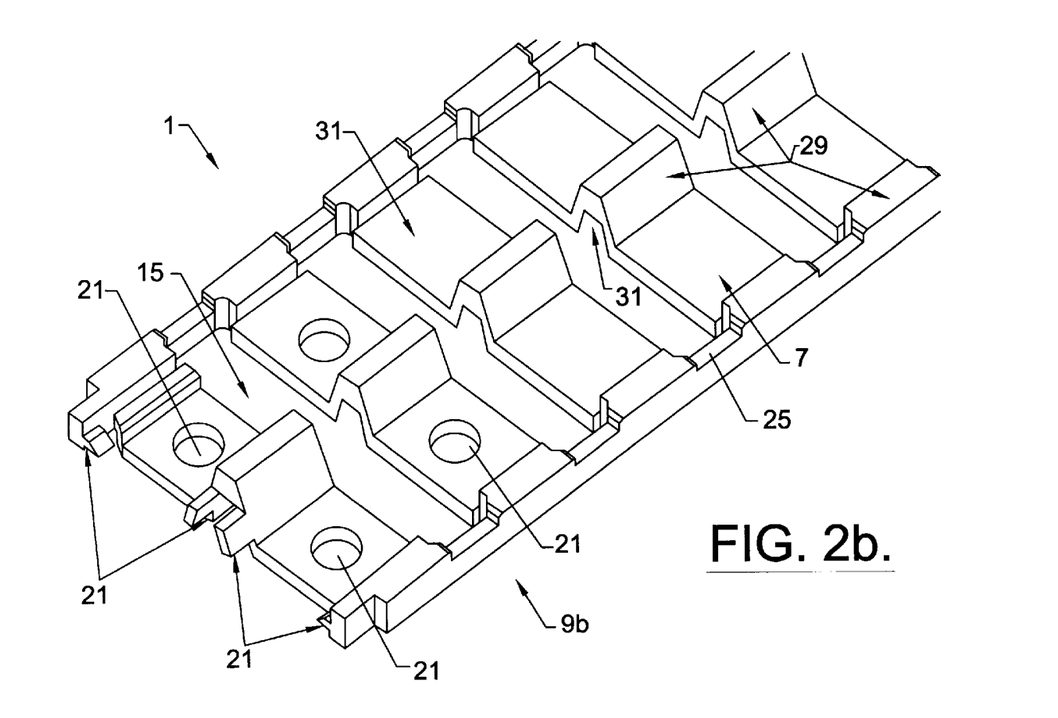

FIGS. 2a and 2b show the opposite main surfaces 3 and 7, respectively, of the component strip 1, at the opposite end region of the strip. This opposite end of the strip comprises a connection part 9b (referred to herein as an "overlapped" connection part) which, in use, interlocks with the type of connection part 9a shown in FIG. 1, of another (substantially identical) component strip 1.

Figure 3A:
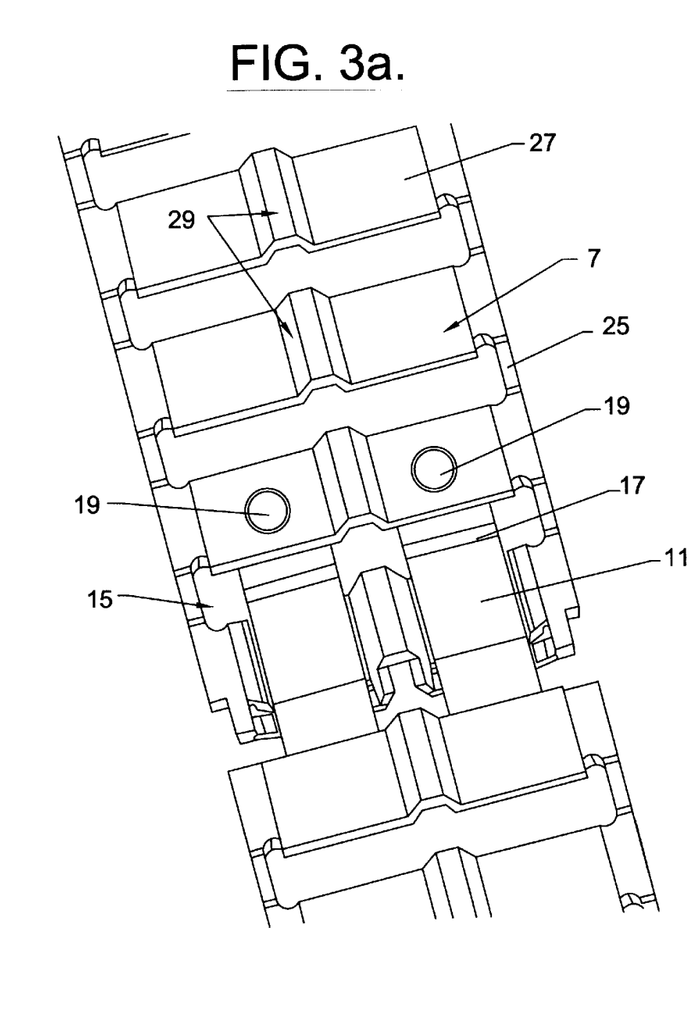
FIG. 3 shows two strips identical to the strip shown in FIGS. 1 and 2, connected together.
Figure 3B:
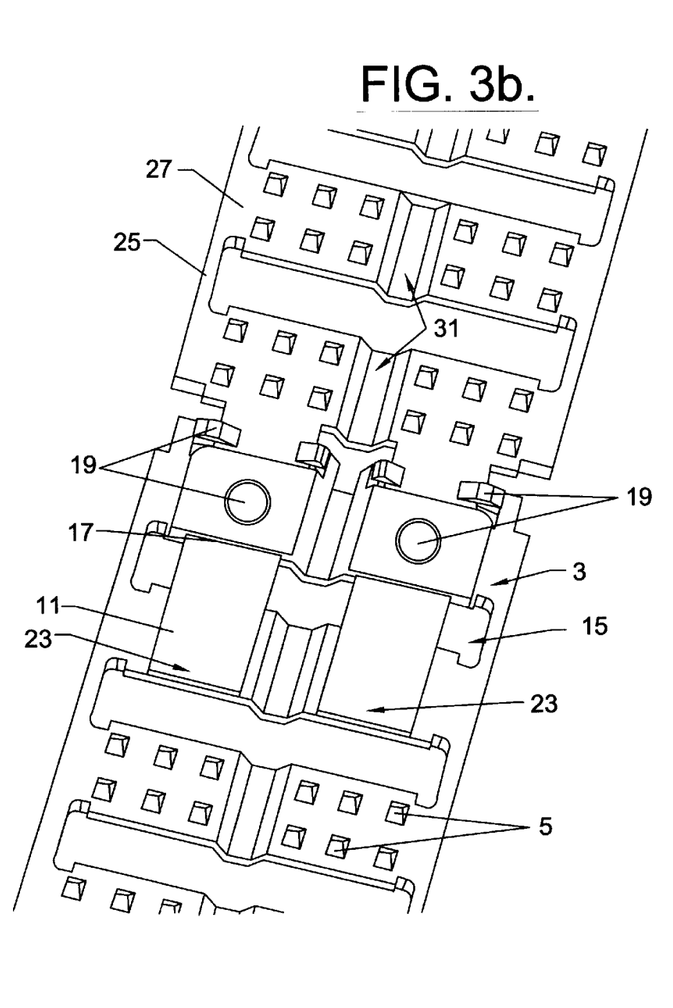

FIGS. 3a and 3b show the opposite main surfaces 7 and 3, respectively, of the component strip which component strip is connected to another, substantially identical, component strip, in the region where the connection parts 9a and 9b of the strips interlock with each other. It can be seen that the extending parts 11 of the connection part 9a each extend through an opening 15 in the connection part 9b. The extending parts 11 each have a step 17 which enables the extending parts of the "overlapping" connection part 9a to overlap the "overlapped" connection part 9b on one main surface 7 of the other strip, to extend through the opening 15 in the "overlapped" connection part 9b, and to overlap the "overlapped" connection part 9b on the other main surface 3 of the other strip. (The terms "overlapped" and "overlapping" are arbitrary, and are used simply for convenience to distinguish between the two types of connection part). Thus, main surface 3 of connection part 9a is in contact with main surface 7 of connection part 9b, and main surface 7 of connection part 9a is in contact with main surface 3 of connection part 9b. In this way, the connection parts 9a and 9b are mutually interlocked. Also, the extending parts 11 of the "overlapping" connection part 9a have projection 19 thereon, which interlock with corresponding recesses (e.g. holes) 21 in the "overlapped" connection part 9b, to help retain the two strips connected together.

It can be seen from FIG. 3 that when, in use, the interconnected strips are wound around an elongate object, an end 23 of the "overlapping" connection part 9a which is furthest from the main part 13 of the strip of which it is part, will be located between the elongate object and the other strip. This is because this end 23 of the "overlapping" connection part 9a is in contact with (i.e. on top of) the main surface 3 of the other strip, which is adapted to face towards the elongate object. Because of this, the interlocking of the connection parts will be reinforced when the interconnected strips are wound around an elongate object.

The strips 1 shown in FIGS. 1 to 3 also include a plurality of alternate collapsible portions 25 and non-collapsible portions 27 along the lengths thereof. The collapsible portions 25 each comprise two webs extending between two non-collapsible portions 27 at the edges of the strip 1. The webs 25 can deform, e.g. by buckling, when, in use the wound strip is radially compressed around a cable or other elongate object.

The strips 1 also have protrusions 29 and recesses 31 which can engage corresponding recesses 31 and protrusions 29 of adjacent windings of the interconnected strips when, in use, the strips are wound around a cable etc. As mentioned above, this profiling of the strips has the advantage of substantially presenting accidental axial displacement of the windings of the interconnected strips with respect to each other. Also, the protrusions 29 and recesses 31 may engage corresponding parts of a housing of a cable splice closure, to secure the wound strips to the closure.

Figure 4:
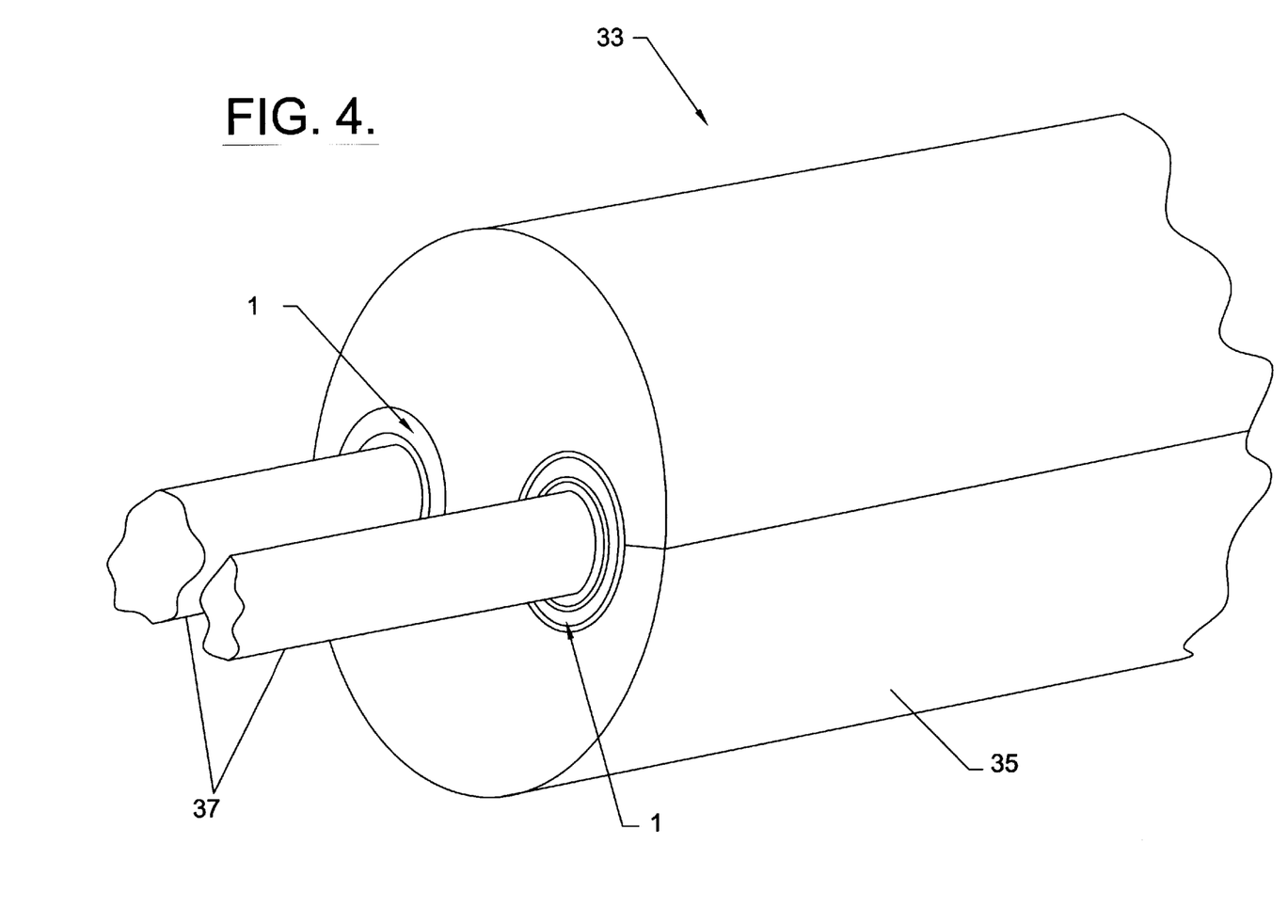
FIG. 4 shows, schematically, part of a cable splice closure incorporating strips according to the invention.

FIG. 4 shows, schematically, part of a cable splice closure 33 according to the invention, incorporating strips 1 according to the invention. The closure 33 comprises a housing 35 having cable entry apertures containing interconnected component strips 1 wound around cables 37 which are extending into the housing through the apertures. The interconnected component strips 1 have each filled the annular gap between their respective cable 37 and entry aperture. One cable 37 is smaller in diameter than the other, and because the cable entry apertures are the same size as each other, the strip wound around this cable is longer than that wound around the other cable. To achieve this, a greater number of individual component strips are connected together than in the other strip.

What is claimed is:

1. A strip for winding around an elongate object to be extended through an elongate object aperture to substantially reduce a gap therebetween, the strip comprising a main part having first and second opposite main surfaces and first and second opposite ends, the first main surface for facing the elongate object, and the second main surface for facing away from the elongate object, the first end having a first connection part extending from the main part and connectable with a second part of another strip, the second end having a second connection part connectable with a first connection part of the other strip to thereby allow a plurality of strips to be connected together, and the main part comprising a plurality of alternately collapsible and substantially non-collapsible portions.

2. A strip according to claim 1 wherein the first connection part is not connectable to the first connection part of the other strip, and the second connection part is not connectable to the second connection part of the other strip.

3. A strip according to claim 1 wherein the first and second connection parts are shaped to overlap the respective second and first connection parts of the other strip.

4. A strip according to claim 1 wherein the second connection part has an opening therein for receiving a portion of the first connection part of the other strip.

5. A strip according to claim 1 wherein the second connection part has an opening therein for receiving a portion of the first connection part of the other strip therethrough so that the first connection part of the other strip overlaps the first and second main surfaces of the main part at the second end of the strip when connected thereto.

6. A strip according to claim 5 wherein at least one of the first and second connection parts has a stepped surface thereof to allow the first connection part of the other strip to overlap the first and second main surfaces of the main part at the second end of the strip when connected thereto.

7. A strip according to claim 1 wherein the first main surface has a plurality of protrusion thereon for enhancing a grip of the strip on the elongate object.

8. A strip according to claim 1 wherein the first connection part has at least first and second opposite mating portions thereon, and the second connection part has at least third and fourth mating portions for respectively mating with first and second opposite mating portions of the first connection part of the other strip.

9. A strip according to claim 1 wherein each of the plurality of collapsible portions comprises a web extending between the substantially non-collapsible portions.

10. A strip according to claim 1 wherein each of the plurality of collapsible portions is flexible to allow the strip to be wound around the elongate object.

11. A strip according to claim 1 wherein the first and second main surfaces have interlocking profiles so that when the strip or the plurality of strips are wound around the elongate object causing the first and second main surfaces to be adjacent to each other, the adjacent first and second main surfaces interlock with each other to substantially prevent displacement of the strip or plurality of strips.

12. A strip for winding around an elongate object to be extended through an elongate object aperture to substantially rescue a gap therebetween, the strip comprising:
   a plurality of substantially identical component strips, each one of the plurality of component strips comprising
      a main part having first and second opposite main surfaces and first and second opposite ends, the first main surface for facing the elongate object, and the second main surface for facing away from the elongate object, the first end having a first connection part extending from the main part and connectable with a second connection part of another one of the plurality of component strips, the second end having a second connection part connectable with a first connection part of the other one of the plurality of component strips, and the main part comprising a plurality of alternately collapsible and substantially non-collapsible portions.

13. A strip according to claim 12 wherein the first connection part is not connectable to the first connection part of the other one of the plurality of component strips, and the second connection part is not connectable to the second connection part of the other one of the plurality of component strips.

14. A strip according to claim 12 wherein the first and second connection strips are shaped to overlap the respective second and first connection parts of the other one of the plurality of component strips.

15. A strip according to claim 12 wherein the second connection part has an opening therein for receiving a portion of the first connection part of the other one of the plurality of component strips.

16. A strip according to claim 12 wherein the second connection part has an opening therein for receiving a portion of the first connection part of the other one of the plurality of component strips therethrough so that the first connection part of the other component strip overlaps the first and second main surfaces of the main part at the second end of the one component strip when connected thereto.

17. A strip according to claim 16 wherein at least one of the first and second connection parts has a stepped surface thereof to allow the first connection part of the other component strip to overlap the first and second main surfaces of the main part at the second end of the one component strip when connected thereto.

18. A strip according to claim 12 wherein the first main surface has a plurality of protrusions thereon for enhancing a grip of the component strip on the elongate object.

19. A strip according to claim 12 wherein the first connection part has at least first and second opposite mating portions thereon, and the second connection part has at least third and fourth mating portions for respectively mating with the first and second opposite mating portions of the first connection part of the other one of the plurality of component strips.

20. A strip according to claim 12 wherein each of the plurality of collapsible portions comprises a web extending between the substantially non-collapsible portions.

21. A strip according to claim 12 wherein each of the plurality of collapsible portions is flexible to allow the strip to be wound around the elongate object.

22. A strip according to claim 12 wherein the first and second main surfaces have interlocking profiles so that when the strip is wound around the elongate object causing the first and second main surfaces to be adjacent to each other, the adjacent first and second main surfaces of the plurality of component strips interlock with each other to substantially prevent displacement of the plurality of component strips.

23. A strip for winding around an elongate object to be extended through an elongate object aperture to substantially reduce a gap therebetween, the strip comprising a main part having first and second opposite main surfaces and first and second opposite ends, the first main surface for facing the elongate object, and the second main surface for facing away from the elongate object, the first end having a first connection part extending from the main part and connectable with a second connection part of another strip, the second end having a second connection part connectable with a first connection part of the other strip to thereby allow a plurality of strips to be connected together, the first connection part having at least first and second opposite mating portions thereon, and the second connection parts having at least third and fourth mating potions for respectively mating with the first and second opposite mating portions of the first connection part, wherein the second connection part has an opening therein for receiving a portion of the first connection part of the other strip therethrough so that the first connection part of the other strip overlaps the first and second main surfaces of the main part at the second end of the strip when connected thereto.

24. A strip according to claim 23 wherein the first connection part is not connectable to the first connection part of the other strip, and the second connection part is not connectable to the second connection part of the other strip.

25. A strip according to claim 23 wherein the first and second connection parts are shaped to overlap the respective second and first connection parts of the other strip.

26. A strip according to claim 23 wherein the second connection part has an opening therein for receiving a portion of the first connection part of the other strip.

27. A strip according to claim 23 wherein at least one of the first and second connection parts has a stepped surface thereof to allow the first connection part of the other strip to overlap the first and second main surfaces of the main part at the second end of the strip when connected thereto.

28. A strip according to claim 23 wherein the first main surface has a plurality of protrusions thereon for enhancing a grip of the strip on the elongate object.

29. A strip according to claim 23 wherein the main part comprises a plurality of alternately collapsible and substantially non-collapsible portions.

30. A strip according to claim 29 wherein each of the plurality of collapsible portions comprises a web extending between the substantially non-collapsible portions.

31. A strip according to claim 29 wherein each of the plurality of collapsible portions is flexible to allow the strip to be wound around the elongate object.

32. A strip according to claim 23 wherein the first and second main surfaces have interlocking profiles so that when the strip or plurality of strips are wound around the elongate object causing the first and second main surfaces to be adjacent to each other, the adjacent first and second main surfaces interlock with each other to substantially prevent displacement of the strip or plurality of strips.

33. A strip for winding around an elongate object to be extended through an elongate object aperture to reduce a gap therebetween, the strip comprising:

a plurality of substantially identical component strips, each one of the plurality of component strips comprising a main part having first and second opposite main surfaces and first and second opposite ends, the first main surface for facing the elongate object, and the second main surface for facing away from the elongate object, the first end having a first connection part extending from the main part and connectable with a second connection part of another one of the plurality of component strips, the second end having a second connection part connectable with a first connection part of the other one of the plurality of component strips, the first connection part having at least first and second opposite mating portions thereon, and the second connection part having at least third and fourth mating portions for respectively mating with first and second opposite mating portions of the first connection part of the other one of the plurality of component strips, wherein the second connection part has an opening therein for receiving a portion of the first connection part of the other one of the plurality of component strips therethrough so that the first connection part of the other component strip overlaps the first and second main surfaces of the main part at the second end of the one component strip when connected thereto.

34. A strip according to claim 33 wherein the first connection part is not connectable to the first connection part of the other one of the plurality of component strips, and the second connection part is not connectable to the second connection part of the other one of the plurality of component strips.

35. A strip according to claim 33 wherein the first and second connection parts are shaped to overlap the respective second and first connection parts of the other one of the plurality of component strips.

36. A strip according to claim 33 wherein the second connection part has an opening therein for receiving a portion of the first connection part of the other one of the plurality of component strips.

37. A strip according to claim 33 wherein at least one of the first and second connection parts has a stepped surface thereof to allow the first connection part of the other component strip to overlap the first and second main surfaces of the main part at the second end of the one component strip when connected thereto.

38. A strip according to claim 33 wherein the first main surface has a plurality of protrusions thereon for enhancing a grip of the strip on the elongate object.

39. A strip according to claim 33 wherein the main part comprises a plurality of alternately collapsible and substantially non-collapsible portions.

40. A strip according to claim 39 wherein each of the plurality of collapsible portions comprises a web extending between the substantially non-collapsible portions.

41. A strip according to claim 39 wherein each of the plurality of collapsible portions is flexible to allow the strip to be wound around the elongate object.

42. A strip according to claim 33 wherein the first and second main surfaces having interlocking profiles so that when the strip is wound around the elongate object causing the first and second main surfaces to be adjacent to each other, the adjacent first and second main surfaces of the plurality of component strips interlock with each other to substantially prevent displacement of the plurality of component strips.

43. A cable splice closure comprising:

a housing for enclosing a cable splice, the housing having at least one cable aperture therein; and at least one strip for winding around a cable to be extended through the cable aperture to reduce a gap between the housing and the cable, the at least one strip comprising a main part having first and second opposite main surfaces and first and second opposite ends, the first main surface for facing the cable, and the second main surface for facing away from the cable, the first end having a first connection part extending from the main part, the second end having a second connection part connectable with a first connection part of another strip to thereby allow a plurality of strips to be connected together, and the main part comprising a plurality of alternately collapsible and substantially non-collapsible portions.

44. A cable slice closure according to claim 43 wherein the second connection part has an opening therein for receiving a portion of the first connection part of another strip therethrough so that the first connection part of the other strip overlaps the first and second main surfaces of the main part at the second end of the strip when connected thereto.

45. A cable splice closure according to claim 44 wherein at least one of the first and second connection parts has a stepped surface thereof to allow the first connection part of the other strip to overlap the first and second main surfaces of the main part at the second end of the strip when connected thereto.

46. A cable splice closure according to claim 43 wherein the first main surface has a plurality of protrusions thereon for enhancing a grip of the strip on the cable.

47. A cable splice closure according to claim 43 wherein the first connection part at least first and second opposite mating portions thereon, and the second connection part has at least third and fourth mating portions for respectively mating with the first and second opposite mating portions of the first connection part of the other strip.

48. A cable splice closure according to claim 43 wherein each of the plurality of collapsible portions comprises a web extending between the substantially non-collapsible portions.

49. A cable splice closure according to claim 43 wherein the first and second main surfaces have interlocking profiles so that when the strip or the plurality of strips are wound around the cable causing the first and second main surfaces to be adjacent to each other, the adjacent first and second main surfaces interlock with each other to substantially prevent displacement of the strip or the plurality of strips.

50. A cable splice closure comprising:

a housing for enclosing a cable splice, the housing having at least one cable aperture therein; and at least one strip for winding around a cable to be extended through the cable aperture to reduce a gap between the housing and the cable, the at least one strip comprising a main part having first and second opposite main surfaces and first and second opposite ends, the first main surface for facing the cable, and the second main surface for facing away from the cable, the first end having a first connection part extending from the main part, the second end having a second connection part connectable with a first connection part of another strip to thereby allow a plurality of strips to be connected together, the first connection part having at least first and second opposite mating portions thereon, and the second connection part having at least third and fourth mating portions for respectively mating with the first and second opposite mating portions of the first connection part, wherein the second connection part has an opening therein for receiving a portion of the first connection part of the other strip therethrough so that the first connection part of the other strip overlaps the first and second main surfaces of the main part at the second end of the strip when connected thereto.

51. A cable splice closure according to claim 50 wherein at least one of the first and second connection parts has a stepped surface thereof to allow the first connection part of the of the strip to overlap the first and second main surfaces of the main part at the second end of the strip when connected thereto.

52. A cable splice closure according to claim 50 wherein the first main surface has a plurality of protrusions thereon for enhancing a grip of the strip on the cable.

53. A cable splice closure according to claim 50 wherein the main part comprises a plurality of alternately collapsible and substantially non-collapsible portions.

54. A cable splice closure according to claim 53 wherein each of the plurality of collapsible portions comprises a web extending between the substantially non-collapsible portions.

55. A cable splice closure according to claim 50 wherein the first and second main surfaces have interlocking profiles so that when the strip or the plurality of strips are wound around the cable causing the first and second main surfaces to be adjacent to each other, the adjacent first and second main surfaces interlock with each other to substantially prevent displacement of the strip or the plurality of strips.

* * * * *